US012057031B2

(12) United States Patent
Nomoto

(10) Patent No.: US 12,057,031 B2
(45) Date of Patent: Aug. 6, 2024

(54) CHARACTER INPUT METHOD, INFORMATION PROCESSING APPARATUS, AND INFORMATION PROCESSING SYSTEM

(71) Applicant: CASIO COMPUTER CO., LTD., Tokyo (JP)

(72) Inventor: Shuhei Nomoto, Nishitokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/102,536

(22) Filed: Jan. 27, 2023

(65) Prior Publication Data
US 2023/0290260 A1 Sep. 14, 2023

(30) Foreign Application Priority Data
Mar. 14, 2022 (JP) .................................. 2022-039211

(51) Int. Cl.
*G09B 7/02* (2006.01)
*G06F 3/04886* (2022.01)
*G09B 19/06* (2006.01)

(52) U.S. Cl.
CPC ........... *G09B 7/02* (2013.01); *G06F 3/04886* (2013.01); *G09B 19/06* (2013.01)

(58) Field of Classification Search
CPC ........ G09B 7/02; G09B 19/06; G06F 3/04886
See application file for complete search history.

(56) References Cited

U.S. PATENT DOCUMENTS

| 7,301,481 B2 * | 11/2007 | Okada ..................... G09B 13/04 |
| | | 341/20 |
| 2007/0046641 A1* | 3/2007 | Lim ....................... G06F 3/0237 |
| | | 345/173 |
| 2008/0140307 A1* | 6/2008 | Chen ....................... G09B 29/10 |
| | | 701/532 |
| 2010/0041455 A1 | 2/2010 | Kura et al. |
| 2012/0249596 A1* | 10/2012 | Colley .................. G06F 3/0418 |
| | | 345/660 |

(Continued)

FOREIGN PATENT DOCUMENTS

| JP | 2002182554 A | 6/2002 |
| JP | 2005215728 A | 8/2005 |

(Continued)

OTHER PUBLICATIONS

Japanese Office Action (and an English language translation thereof) dated Mar. 5, 2024, issued in counterpart Japanese Application No. 2022-039211.

*Primary Examiner* — Eddy Saint-Vil
(74) *Attorney, Agent, or Firm* — Holtz, Holtz & Volek PC

(57) ABSTRACT

A character input method according to the present disclosure, a computer is configured to execute a process of causing, in a case where each of characters of an answer character string corresponding to a correct-answer character string is input by a user by using a plurality of keys included in a keyboard layout displayed on a display, the display to display the keyboard layout, in a state indicating that a first character of the correct-answer character string, and at least one second character other than the first character, are inputtable, and a third character other than the first character and the second character is non-inputtable, the first character corresponding to an input character position of the answer character string.

14 Claims, 12 Drawing Sheets

(56) References Cited

U.S. PATENT DOCUMENTS

2012/0260207 A1* 10/2012 Treskunov .......... G06F 3/04883
715/773
2013/0021256 A1   1/2013 Manzen
2016/0364140 A1  12/2016 Shkedy et al.

FOREIGN PATENT DOCUMENTS

| JP | 2008152403 A | 7/2008 |
| JP | 2008173323 A | 7/2008 |
| JP |    5955445 B1 | 7/2016 |
| JP | 2020012950 A | 1/2020 |
| KR | 20110100434 A | 9/2011 |
| WO | 2011118602 A1 | 9/2011 |

* cited by examiner

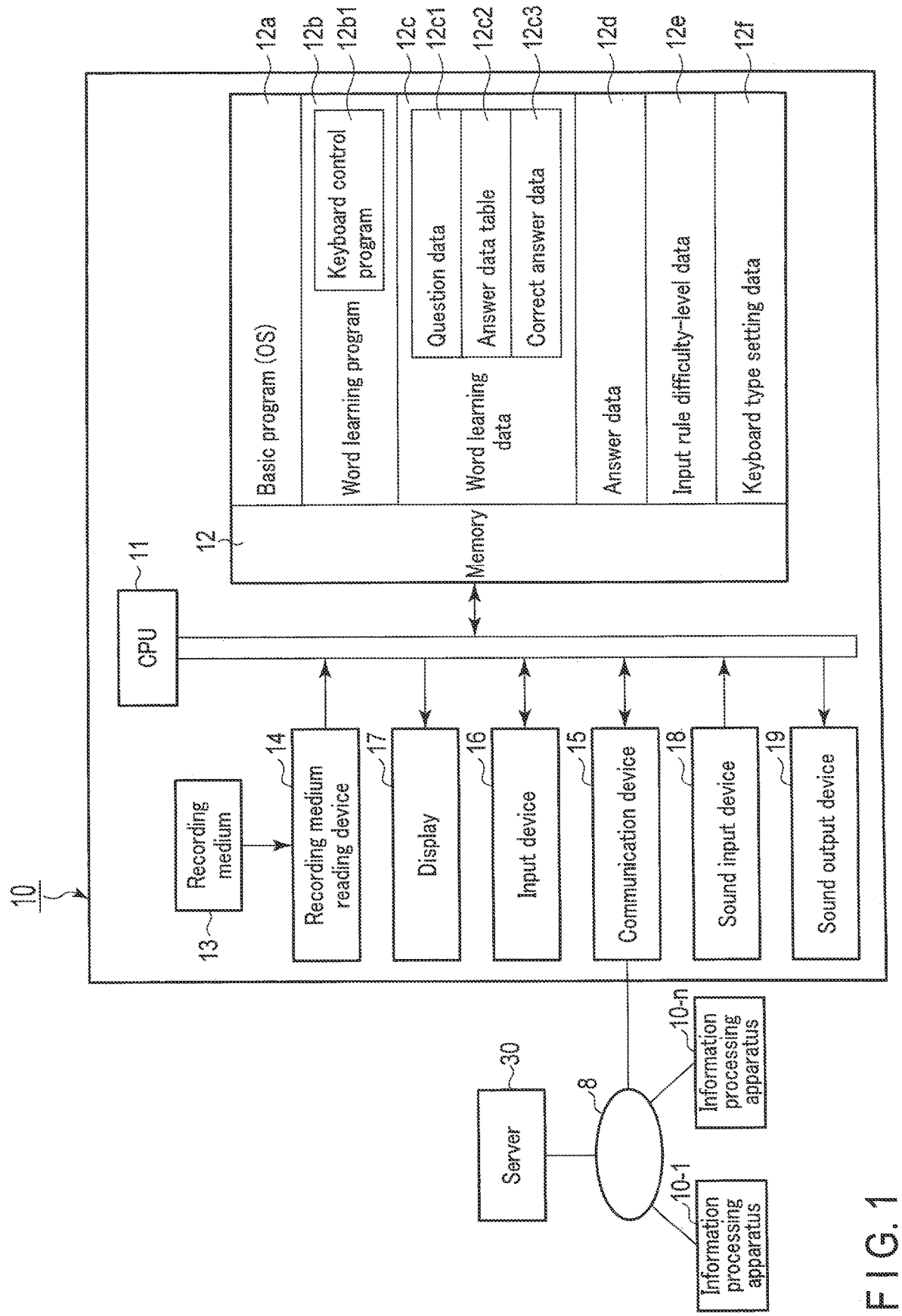
F I G. 1

| User ID | Question | Correct answer | Answer | Correct/incorrect determination |
|---|---|---|---|---|
| 00001 | 奮闘する | struggle | struggle | OK |
| 00002 | 奮闘する | struggle | straggle | NG |
| 00013 | 奮闘する | struggle | scrugle | NG |
| 00020 | 奮闘する | struggle | sklugglu | NG |
| 00024 | 奮闘する | struggle | grapple | NG |
| 00271 | 奮闘する | struggle | fight | NG |
| 00150 | 奮闘する | struggle | hassle | NG |

F I G. 9

CHARACTER INPUT METHOD, INFORMATION PROCESSING APPARATUS, AND INFORMATION PROCESSING SYSTEM

CROSS-REFERENCE TO RELATED APPLICATIONS

This application is based upon and claims the benefit of priority from prior Japanese Patent Application No. 2022-039211, filed Mar. 14, 2022, the entire contents of which are incorporated herein by reference.

TECHNICAL FIELD

The present disclosure relates generally to a character input method, an information processing apparatus, and an information processing system.

DESCRIPTION OF RELATED ART

There are many learning applications used in information processing apparatuses such as smartphones, and most of them include test functions of a question-and-answer format. The test functions of the question-and-answer format, for the most part, are in such a format that an answer is given by selecting one of a small number of choices, or in such a format that an answer is given by a complete discretionary input using a software keyboard.

In the former answering method by the selection of choices, a user's motivation to answer is easily maintained, but there are not so many tests of the format similar to this method in actual tests in educational institutions or in qualifying examinations, and there is concern that learning would progress in a manner to specialize in the learning application of this method.

In the latter answering method by the discretionary input, conversely, learning adaptable to various kinds of other tests is performed, but since the user has to input all answers, it is difficult to give correct answers in the state in which comprehension and retention are low. Thus, there is a weak point that it is difficult to maintain the motivation at the beginning of learning, which is most important.

Jpn. Pat. Appln. KOKAI Publication No. 2008-173323 describes an answering method by the selection of choices, and an answering method by a discretionary input using a software keyboard.

BRIEF SUMMARY

In a character input method according to the present disclosure, a computer is configured to execute a process of causing, in a case where each of characters of an answer character string corresponding to a correct-answer character string is input by a user by using a plurality of keys included in a keyboard layout displayed on a display, the display to display the keyboard layout, in a state indicating that a first character of the correct-answer character string, and at least one second character other than the first character, are inputtable, and a third character other than the first character and the second character is non-inputtable, the first character corresponding to an input character position of the answer character string.

BRIEF DESCRIPTION OF THE DRAWINGS

The components in the drawings are not necessarily to scale relative to each other.

FIG. 1 is a block diagram illustrating a configuration of electric circuitry of an information processing apparatus according to an embodiment of the present invention.

FIG. 9 is a view illustrating an example of an answer data table in the present embodiment.

DETAILED DESCRIPTION

Hereinafter, embodiments of the present invention will be described with reference to the accompanying drawings.

Figure 2:
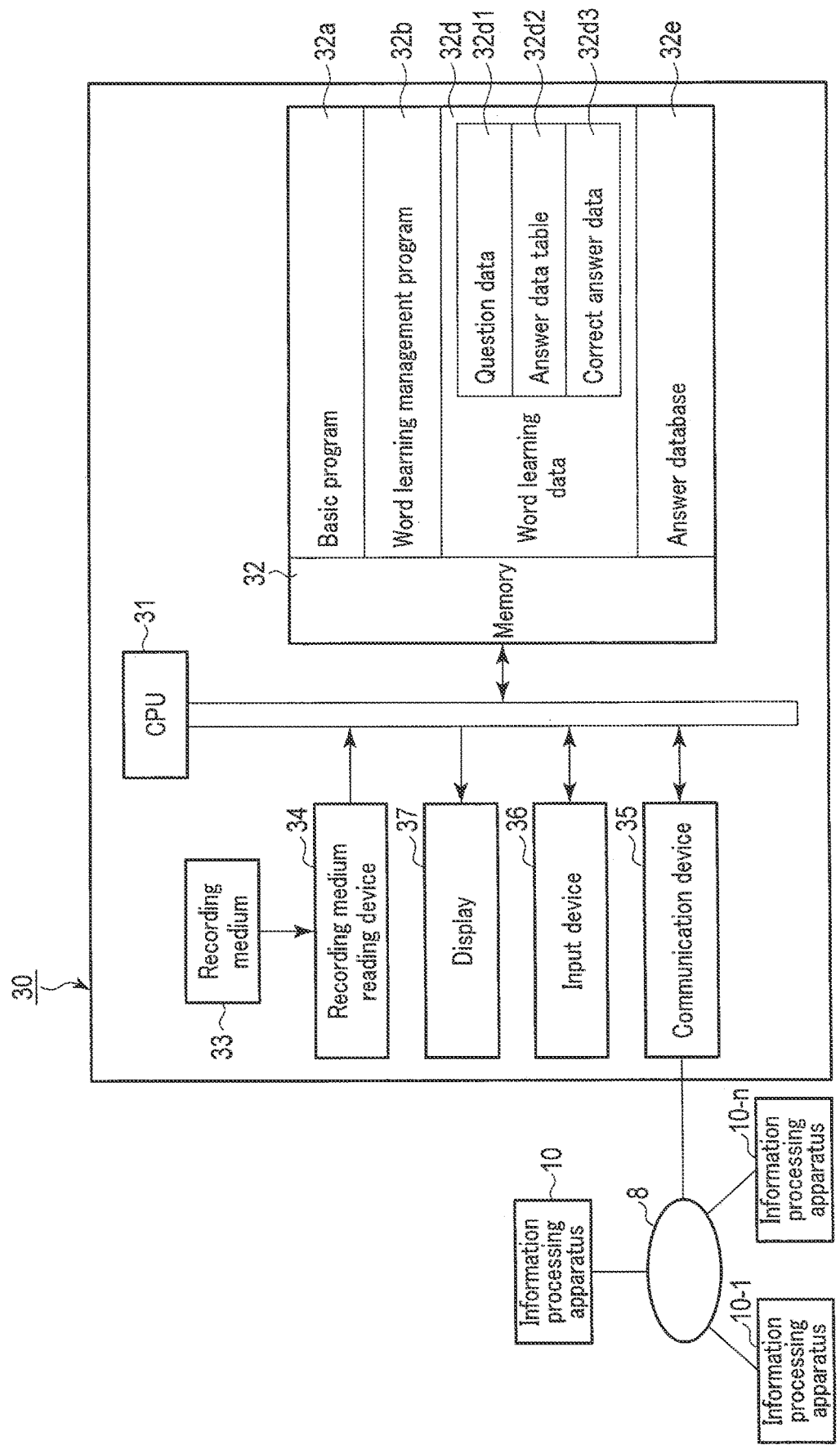
FIG. 2 is a functional block diagram illustrating electronic circuitry of a server according to the embodiment of the present invention.

FIG. 1 and FIG. 2 are block diagrams illustrating configurations of a system according to an embodiment of the present invention. FIG. 1 illustrates a detailed configuration of electric circuitry of an information processing apparatus 10 in the present embodiment, and FIG. 2 illustrates a detailed configuration of electronic circuitry of a server 30 in the present embodiment.

The system in the present embodiment enables a user of the information processing apparatus, 10, 10-1, ..., 10-n, to perform a word learning test that is provided by the server 30.

The word learning test is a test of a question-and-answer format in which, for example, a word by a first language is displayed, and a user gives an answer word (a spelling (character string) representative of an equivalent word in translation), which corresponds to the displayed word by the first language and is expressed by a second language that is different from the first language, by a complete discretionary input using a software keyboard or the like. Alternatively, the word learning test is a test of the question-and-answer format in which, for example, a word by a first language is displayed, and a user gives an answer word (for example, a spelling (character string) representative of a reading by hiragana/katakana) of a written expression by the same first language, which is different from the written expression (for example, kanji) of the displayed word, by a complete discretionary input using a software keyboard or the like.

The software keyboard has a keyboard layout including a plurality of keys corresponding to a plurality of characters that are input targets, and, by selecting keys one by one, characters corresponding to the keys can be input.

In the present embodiment, an example is illustrated in which the information processing apparatus, 10, 10-1, ..., 10-n, is constructed as a smartphone. Note that the information processing apparatus 10 can be implemented by various kinds of electronic equipment such as a personal computer, a tablet PC, a game console, and an electronic dictionary.

The information processing apparatus 10 is connected to the server 30 through a network 8. The server 30 is connected to a plurality of information processing apparatus 10, 10-1, ..., 10-n through the network 8.

The network 8 includes various communication paths capable of wired or wireless communications, such as the internet, a LAN (Local Area Network) and a public switched telephone network.

As illustrated in FIG. 1, the information processing apparatus 10 has a configuration of a computer that reads in a program recorded in various kinds of recording media, or reads in a program that is transmitted, with the operation of the computer being controlled by the read-in program, and a CPU (central processing unit) 11 is included in the electronic circuitry of the computer.

The CPU 11 functions as a control device that controls the entirety of the information processing apparatus 10. The CPU 11 controls operations of respective circuitry components in accordance with a program prestored in a memory 12, or a program read in the memory 12 from a recording medium 13 such as a ROM card via a recording medium reading device 14, or a program that is downloaded and read in the memory 12 from an external device (a server or the like) that provides the program via the network 8 such as the internet.

The program stored in the memory 12 is activated in response to an input signal corresponding to a user operation from an input device 16, or a connection communication signal of connection to the recording medium 13, such as an EEPROM (trademark), RAM or ROM, which is connected via the recording medium reading device 14.

The memory 12, the recording medium reading device 14, a communication device 15, the input device 16, a display 17, a sound input device (microphone) 18 and a sound output device (speaker) 19 are connected to the CPU 11.

Programs stored in the memory 12 include a basic program (OS: Operating System) 12a that controls the entirety of the apparatus, and various application programs. The application programs include a word learning program 12b for performing a word learning test that is provided by the server 30. By the word learning program 12b, the CPU 11 executes a word learning process to be described later (see FIG. 3 and FIG. 4).

The word learning program 12b includes a keyboard control program 12b1 that controls the display of the software keyboard for inputting a word (character string) that is an answer at a time of performing a word learning test. In general, the software keyboard can input, by discretionary selection, all characters that are input targets in the keyboard layout. However, in the present embodiment, by the control of the keyboard control program 12b1, a character input method is provided in which, in a case of performing a word learning test, inputtable characters in the keyboard layout are restricted in accordance with the content of a question of the word learning test, or in accordance with a character or the like that is an answer input by a user operation. In other words, a character input method is provided which makes it possible to utilize the word learning test in a state of maintaining a motivation from the beginning of learning, and makes it expectable to achieve retention in memory by a form with high applicability.

The memory 12 stores word learning data 12c, answer data 12d, input rule difficulty-level data 12e, keyboard type setting data 12f and the like, which relate to the execution of the word learning program 12b (word learning process).

The word learning data 12c is data that is provided from the server 30 in order to perform a word learning test. The word learning data 12c includes, in regard to each question, for example, question data 12c1 indicative of a word used in the word learning test, an answer data table 12c2 in which answer data (words) to a question by a plurality of users are totalized in regard to each question (word), and correct answer data 12c3 indicative of a spelling (correct-answer character string) that is a correct answer to a word that is a question.

The answer data 12d is data indicative of an answer content to each question (word), the answer content being input by a user operation (a key operation on the software keyboard) in a word learning test performed based on the word learning data 12c. After the word learning test is performed, the answer data 12d is transmitted to the server 30, and is provided for the generation of an answer data table in which answer data (answer character strings) to a question by users are totalized in regard to each question (word).

The input rule difficulty-level data 12e is data indicative of a difficulty level of the input rule of characters using the software keyboard at a time of performing a word learning test. In the input rule difficulty-level data 12e, for example, the difficulty level is set by any one of levels, such as three levels of 1 (easy), 2 (normal) and 3 (difficult). The keyboard control program 12b1 restricts inputtable characters in the keyboard layout of the software keyboard, in accordance with the difficulty level indicated by the input rule difficulty-level data 12e.

The input rule difficulty-level data 12e may be discretionarily set by a user, for example, in a setting function that is executed by the word learning program 12b, or the difficulty level may be set based on a performance result of past word learning tests. The difficulty level based on the performance result may be determined according to a predetermined rule (for example, a correct answer rate, a correct answer number) by a process of the word learning program 12b, with the past performance result being recorded in the information processing apparatus 10, or may be determined according to a predetermined rule (for example, a correct answer rate, a correct answer number) by a process of a word learning management program 32b in the server 30 in regard to the answer data of each user received from the information processing apparatus 10.

The keyboard type setting data 12f is data indicative of the type (input keyboard type) of a software keyboard displayed on the display 17 at a time of inputting characters. The keyboard type setting data 12f is set in accordance with an input keyboard type instructed by a user operation, for example, in the setting function.

The communication device 15 executes communication control to communicate with some other information processing apparatus such as the server 30, via the network 8 including the internet, a LAN (Local Area Network and LTE (Long Term Evolution) (trademark), or executes communication control to perform near-field wireless communication, such as Bluetooth (trademark) or Wi-Fi (trademark), with some other information processing apparatus in the near field.

The input device 16 is a device for inputting various data or instructions by a user operation or the like, and includes, for example, a keyboard, a button, and a touch panel that is integrated with the display 17. On the touch panel, data indicative of characters or the like can be input, for example, by a touch operation on the software keyboard displayed on the display 17.

The display 17 is constructed as, for example, a touch panel-type display on which a touch panel is stacked. The display 17 is implemented, for example, by a display device such as a liquid crystal display (LCD) or an organic EL (electroluminescence) display.

The sound input device 18 is a microphone that is used in order to input a voice uttered by the user.

The sound output device 19 is a speaker that is used in order to output a voice, an operation sound, music, or the like.

The information processing apparatus 10 with the above configuration implements functions to be described in the following description of operations, by the CPU 11 controlling the operations of the respective circuitry components in accordance with instructions described in various programs such as the word learning program 12b, and by software and hardware cooperating with each other.

As illustrated in FIG. 2, the server 30 has a configuration of a computer that reads in a program recorded in various kinds of recording media, or reads in a program that is transmitted, with the operation of the computer being controlled by the read-in program, and a CPU (central processing unit) 31 is included in the electronic circuitry of the computer.

The CPU 31 functions as a control device that controls the entirety of the server 30. The CPU 31 controls operations of respective circuitry components in accordance with a program prestored in a memory 32, or a program read in the memory 32 from a recording medium 33 such as a ROM card via a recording medium reading device 34, or a program that is downloaded and read in the memory 32 from an external device (a server or the like) that provides the program via the network 8 such as the internet.

The program stored in the memory 32 is activated in accordance with an input signal corresponding to a user operation from an input device 36, or a connection communication signal of connection to the recording medium 33, such as an EEPROM (trademark), RAM or ROM, which is connected via the recording medium reading device 34.

The memory 32, the recording medium reading device 34, a communication device 35, the input device 36, and a display 37 are connected to the CPU 31.

Programs stored in the memory 32 include a basic program (OS: Operating System) 32a that controls the entirety of the apparatus, and various application programs. The application programs include a word learning management program 32b for providing a word learning test to the information processing apparatus 10. By the word learning management program 32b, the CPU 31 executes a word learning management process to be described later (see FIG. 5).

The memory 32 stores word learning data 32d, an answer database 32e and the like, which relate to the execution of the word learning management program 32b (word learning management process).

The word learning data 32d is data that is provided from the server 30 in order to perform a word learning test in the information processing apparatus 10. The word learning data 32d includes, in regard to each question, for example, question data 32d1 indicative of a word used in the word learning test, an answer data table 32d2 in which answer data (words) to a question by a plurality of users are totalized in regard to each question (word), and correct answer data 32d3 indicative of a spelling (correct-answer character string) that is a correct answer to a word that is a question.

The answer database 32e is a database in which answer data is registered, the answer data being indicative of an answer content (answer character string) to each question (word), which is input by a user operation (a key operation on the software keyboard) in a word learning test performed in the information processing apparatus 10. After the word learning test is performed in the information processing apparatus 10, the answer data is acquired from the information processing apparatus 10 and registered in the answer database 32e. The answer data table 32d2 is generated by totalizing the answer data, which is registered in the answer database 32e, in regard to each question.

The communication device 35 executes communication control to communicate with the information processing apparatus 10 or the like via the network 8 including the internet, a LAN (Local Area Network and LTE (Long Term Evolution) (trademark), or executes communication control to perform near-field wireless communication, such as Bluetooth (trademark) or Wi-Fi (trademark), with some other information processing apparatus in the near field.

The input device 36 is a device for inputting various data or instructions by a user operation or the like, and includes, for example, a keyboard, a button, and a touch panel that is integrated with the display 37.

The display 37 is implemented, for example, by a display device such as a liquid crystal display (LCD) or an organic EL (electroluminescence) display.

The server 30 with the above configuration implements functions to be described in the following description of operations, by the CPU 31 controlling the operations of the respective circuitry components in accordance with instructions described in various programs such as the word learning management program 32b, and by software and hardware cooperating with each other.

Next, an operation of the system in the present embodiment is described.

Figure 3:
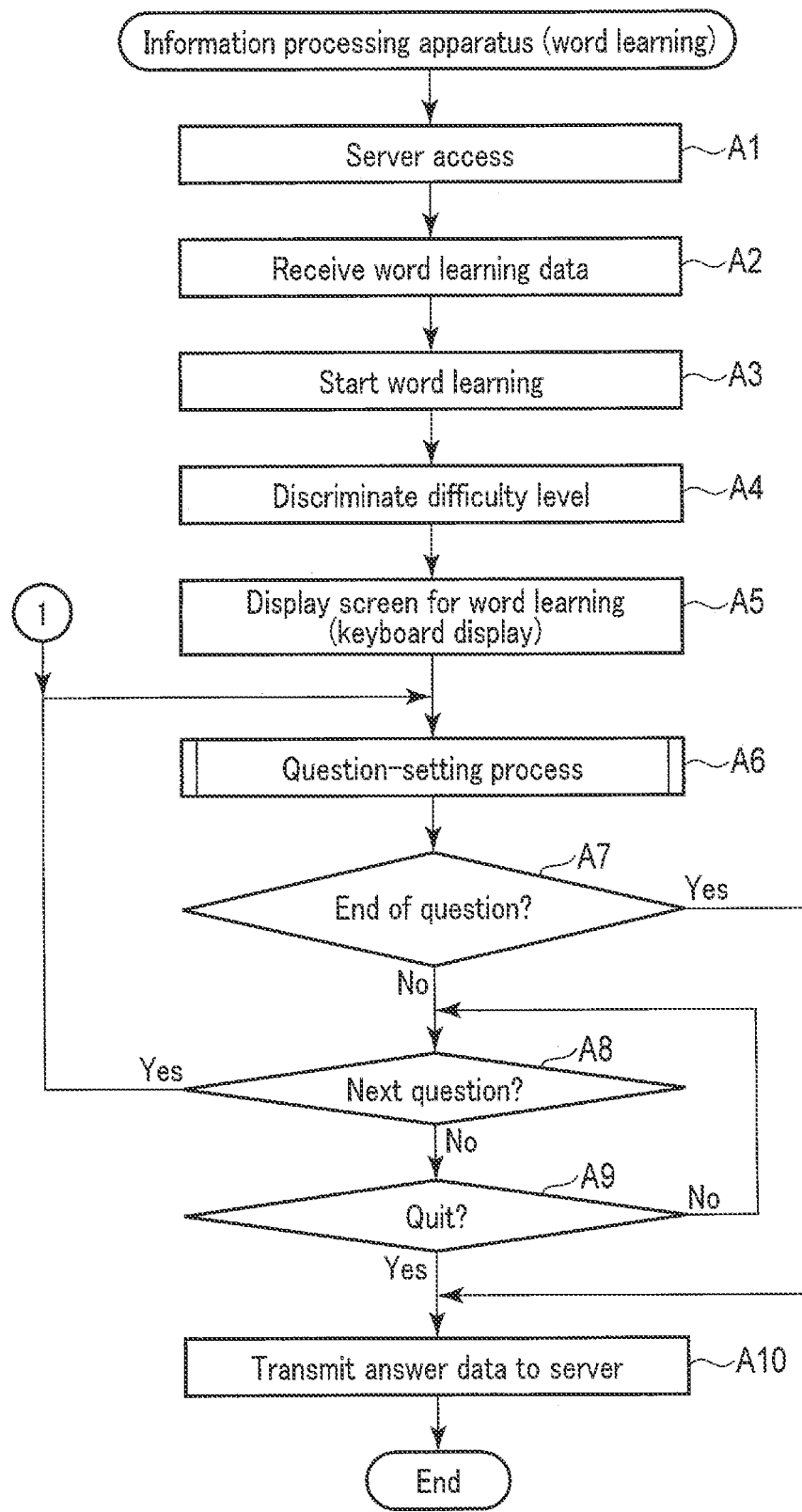
FIG. 3 is a flowchart illustrating a word learning process of the information processing apparatus in the present embodiment.
Figure 4:
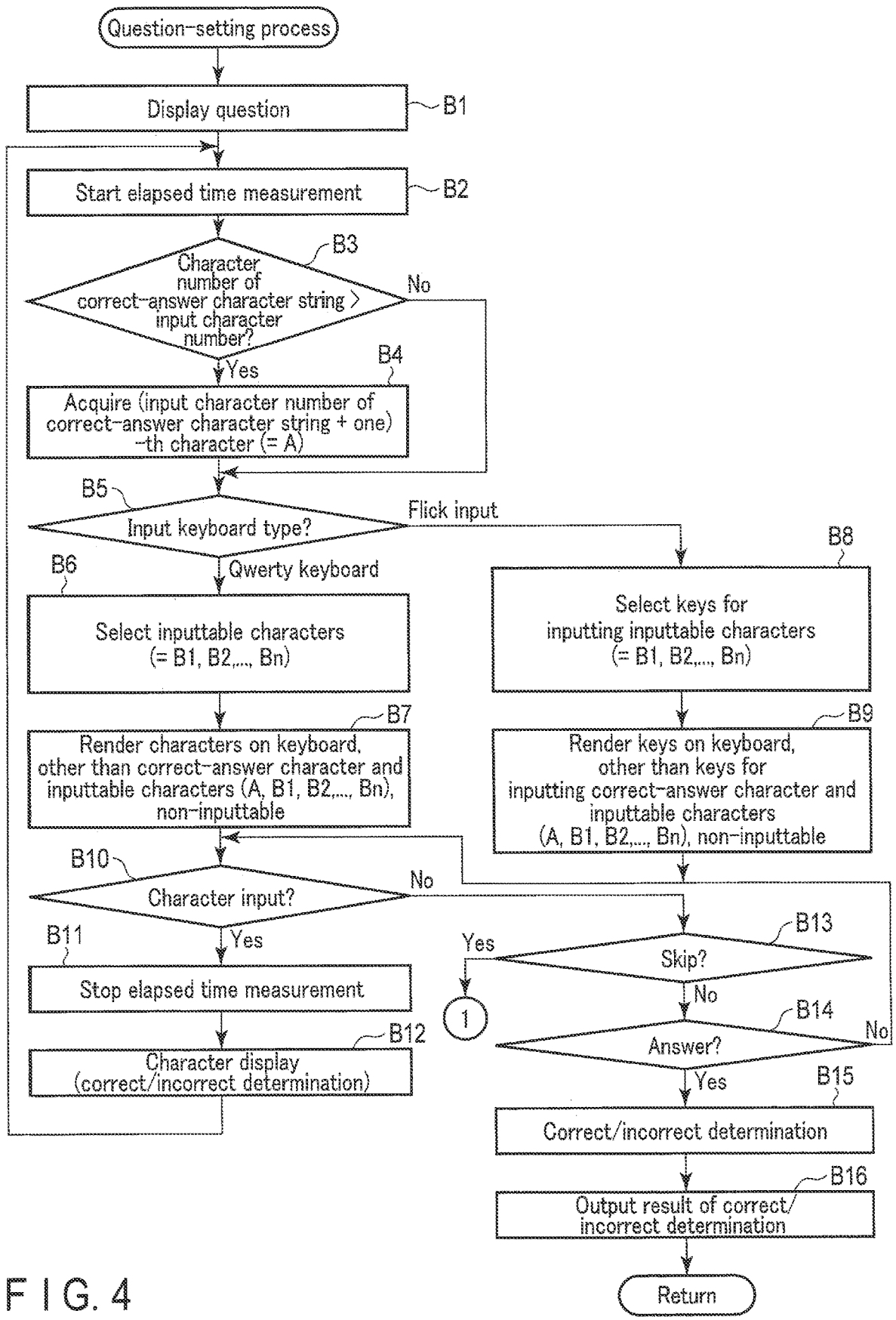
FIG. 4 is a flowchart illustrating a question-setting process of the word learning process illustrated in FIG. 3.
Figure 5:
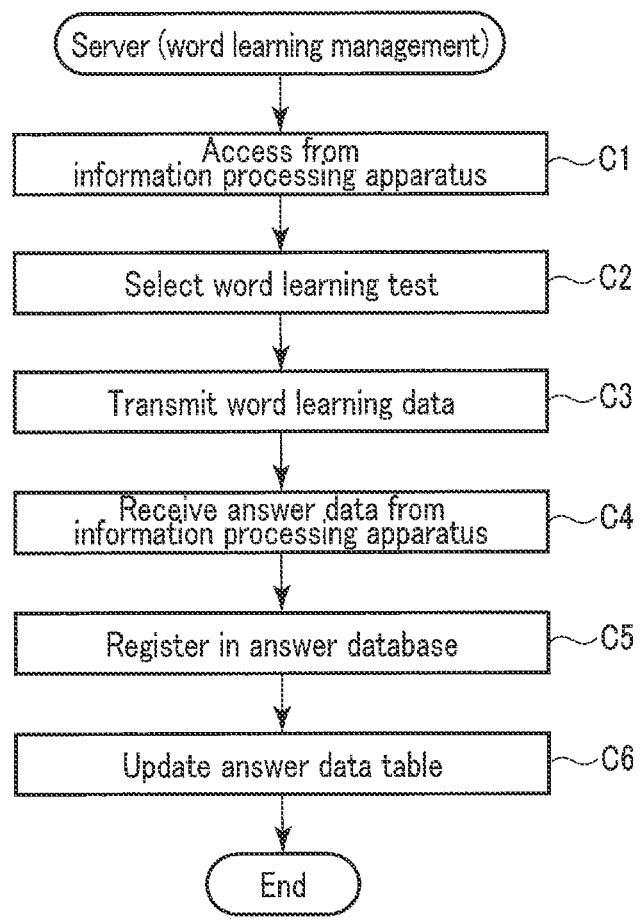
FIG. 5 is a flowchart illustrating a word learning management process of the server in the present embodiment.

FIG. 3 is a flowchart illustrating the word learning process of the information processing apparatus 10 in the present embodiment. FIG. 4 is a flowchart illustrating a question-setting process of the word learning process illustrated in FIG. 3. FIG. 5 is a flowchart illustrating the word learning management process of the server 30 in the embodiment.

To begin with, a description is given of a basic character input method in which inputtable characters in the software keyboard are restricted in a case of performing a word learning test in the information processing apparatus 10.

For example, in the basic character input method, in a case of displaying a software keyboard (keyboard layout) on the display 17 at a time of performing a word learning test, a character (first character), which corresponds to an input character position of a spelling that is a correct answer, and is based on an input character position of an answer character in the spelling of the correct answer corresponding to a word that is a question of the word learning test, and at least one character (second character) other than the first character, are rendered inputtable, and a character (third character) other than the first character and the second character is rendered non-inputtable. Specifically, a software keyboard is provided which restricts inputtable characters such that, of all the characters in the keyboard layout, some characters (first character and second character) including a character that is a correct answer are rendered inputtable and the third character other than the first character and the second character cannot be input (i.e., is set in a non-inputtable state). Hereinafter, a character, which can be input on the software keyboard, is referred to as "inputtable character".

The software keyboard, which restricts inputtable characters, clearly indicates an inputtable/non-inputtable character (key) to the user, by displaying a key of an inputtable character (first character, second character) and a key of a non-inputtable character (third character) in different display modes.

Thereby, even in a case where the user gives an answer to a question (word) that the user does not understand, since the possibility that the user can input a correct character increases by restricting inputtable characters, the user can keep the motivation to answer, and it is expectable that this leads to an enhancement of the will to study. In addition, by displaying the software keyboard that is restricted to inputtable characters, an impression increases that a character that is an answer is selected from inputtable characters that are visually small in number, and retention in memory can be expected.

Applied examples of the character input method in the present embodiment include (1) a method (first method) of selecting inputtable characters, based on answer characters that were input in connection with words in the past (for example, erroneous characters at the time of answering in the past), (2) a method (second method) of selecting inputtable characters, based on the difficulty level indicated by the input rule difficulty-level data 12e, (3) a method (third method) of changing inputtable characters in accordance with an elapsed time from a time at which an answer character becomes inputtable, and (4) a method (fourth method) of selecting inputtable characters in accordance with a result of correct/incorrect determination in regard to an answer character that was input to a question. The applied examples ((1) to (4)) of the character input method will be described later.

In the description below, the basic character input method in the present embodiment is first described, and a process relating to the applied examples ((1) to (4)) of the character input method is omitted.

To begin with, in a case of performing word learning provided by the server 30, a user using the information processing apparatus 10 activates the word learning program 12b and causes a word learning process to start.

The CPU 11 of the information processing apparatus 10 starts the word learning process and accesses the server 30 through the communication device 15 (FIG. 3, step A1). Here, the CPU 11 causes user identification data (for example, user ID and password) to be input by a user operation, and transmits the user identification data to the server 30. In addition, the CPU 11 transmits, together with the user identification data, information indicating that the word learning process is started in the information processing apparatus 10, to the server 30 via the communication device 15.

Upon being accessed from the information processing apparatus 10 through the communication device 35 (FIG. 5, step C1), the CPU 31 of the server 30 starts the word learning management program 32b, based on the information that was transmitted from the information processing apparatus 10 and indicates that the word learning process was started in the information processing apparatus 10, identifies the user (or the information processing apparatus 10), based on the similarly transmitted user identification data, and selects, according to a predetermined rule, a word learning test of, for example, a predetermined number of questions, which is provided to the user (information processing apparatus 10) (step C2).

For example, in a case where the results of word learning tests (for example, a correct answer rate, the number of word learning tests performed, a learning level) are recorded for each user discriminated based on user identification data, the CPU 31 can select questions of a word learning test, based on these results. In addition, in a case where the personal information (for example, the age or the like) of each user is recorded, questions of a word learning test can be selected based on the personal information. Besides, word learning, which the user has not performed in the past, may simply be selected and provided.

Upon selecting the questions of the word learning test, the CPU 31 transmits the word learning data 32d of this word learning test to the information processing apparatus 10 (step C3). Note that it is assumed that the word learning data 32d of, for example, ten questions, is selected and transmitted as a batch to the information processing apparatus 10.

Note that in the case of using the basic character input method, it suffice if the question data 32d1 and the correct answer data 32d3 are included in the word learning data 32d that is transmitted from the server 30 to the information processing apparatus 10.

On the other hand, upon receiving the word learning data 32d from the server 30, the CPU 11 of the information processing apparatus 10 causes the memory 12 to store the word learning data 32d (word learning data 12c), and starts the word learning based on the word learning data 12c (FIG. 3, step A3).

Here, in the case of using the second method, the details of which are described later, the CPU 11 determines the difficulty level by referring to the input rule difficulty-level data 12e stored in the memory 12 (step A4). In the case of not using the second method, the process of step A4 can be skipped.

Next, the CPU 11 causes the display 17 to display a screen for a word learning test (step A5), and executes a question-setting process (step A6 (FIG. 4)). A software keyboard for a character input is displayed on the screen for the word learning test.

Figure 6:
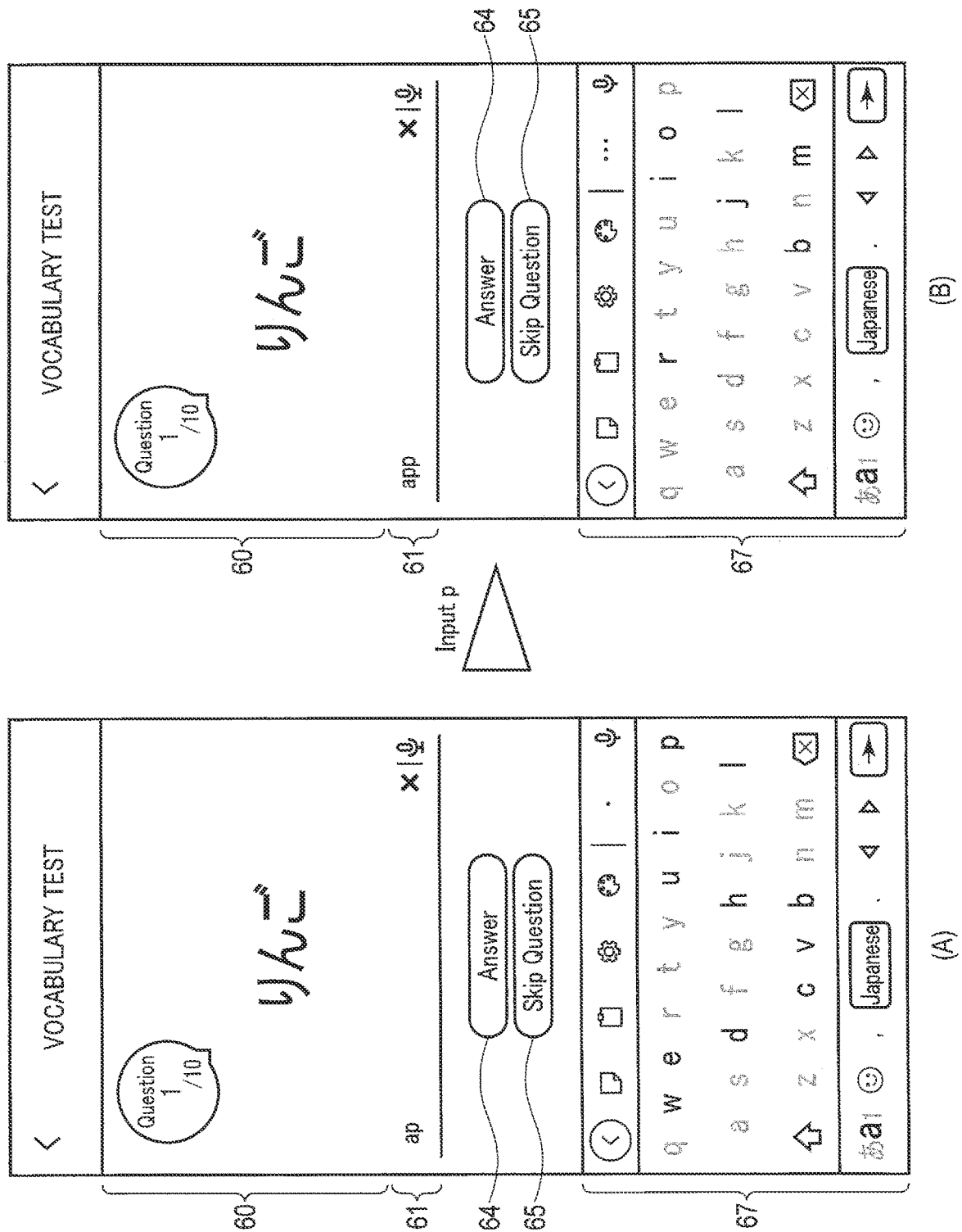
FIG. 6 is a view illustrating an example of a screen at a question-setting time of word learning in the present embodiment.

FIG. 6 part (A) and FIG. 6 part (B) are Figures illustrating an example of a screen at a time of setting a question of word learning in the present embodiment. Note that FIG. 6 part (A) and FIG. 6 part (B) illustrate not an initial-state screen for the word learning test, but a state in which characters (two characters in FIG. 6) that are an answer to the question have been input. The screen at the question-setting time is provided with a question word area 60 that displays a word that is a question of the word learning test; an input character area 61 that displays characters input by an operation on the software keyboard as an answer; an answer button 64 for instructing an answer completion; a skip button 65 for ending an answer and instructing a transition to the next question; and a keyboard area 67 that displays a software keyboard.

The keyboard area 67 displays a software keyboard of a keyboard layout corresponding to a preset input keyboard type that is discriminated by referring to the keyboard type setting data 12f. Examples of the input keyboard type include "qwerty keyboard" and "flick input keyboard". The "qwerty keyboard" is a keyboard with a keyboard layout in which all characters that are input targets are arranged. The "flick input keyboard" is a keyboard with a keyboard layout in which all characters that are input targets are classified into a plurality of groups, and only representative characters of the respective groups are arranged. For example, in the "flick input keyboard" for inputting "hiragana", the characters of the "あ-column (a-column)", the characters of the "か-column (ka-column)", the characters of the "さ-column (sa-column)", . . . , of the Japanese kana syllabary are grouped, respectively, and the keys of characters of "あ", "か", "さ", . . . , are arranged as a keyboard layout. In addition, in the "flick input keyboard" for inputting "alphabet", for example, the characters of "ABC", the characters of "DEF", the characters of "GHI", . . . , are grouped, respectively, and the keys of representative characters "A", "D", "G", . . . , of the respective groups are arranged as a keyboard layout. In the "flick input keyboard", by selecting (by a touch on the tablet) the key of a character on the keyboard layout, the keys of the other characters in the group are displayed around the selected key, and are rendered selectable.

FIG. 6 part (A) and FIG. 6 part (B) illustrate an example of the display of the software keyboard of the "qwerty keyboard type", and FIG. 8 part (A) and FIG. 8 part (B), which will be described later, illustrate an example of the display of the software keyboard of the "flick input type".

Note that a software keyboard of an input keyboard type, other than the "qwerty keyboard type" and "flick input type", may be displayed.

The CPU 11 causes the question word area 60 to display a word that is a question, based on the question data 12*cl* of a word learning test of a first question (FIG. 4, step B1). In addition, along with the start of display of the word, the CPU 11 starts measuring an elapsed time T from a time at which an answer character to the question becomes inputtable (step B2) (the elapsed time T is used in the third method to be described later).

In order to display a software keyboard corresponding to an input character position of an answer character to the question, the CPU 11 compares a character number (the number of characters) of a correct-answer character string to the question and an input character number (the number of characters that are input) up to the present. Here, if the character number of the correct-answer character string is greater than the input character number, i.e., if answer characters of a necessary character number are not input as the answer to the question (step B3, Yes), the CPU 11 acquires an (input character number+one)-th character (expressed as "A") from the correct-answer character string as an inputtable character on the software keyboard (step B4). In other words, the CPU 11 acquires a corresponding character in the correct-answer character string, which corresponds to an input character position of an answer character to the word that is the question (a character (first character) of a correct answer, which is to be input as an answer character) (step B4).

Note that if the answer characters of the necessary character number have been input as the answer to the question (step B3, No), the CPU 11 does not acquire an inputtable character on the software keyboard.

Next, the CPU 11 executes a process for acquiring, in addition to the previously acquired character (A), at least one character (second character) that is inputtable on the software keyboard (steps B5 to B9).

To begin with, the CPU 11 discriminates the input keyboard type of the software keyboard displayed on the keyboard area 67 of the screen at the present question-setting time, by referring to the keyboard type setting data 12*f*.

If the input keyboard type is the "qwerty keyboard" (step B5, Qwerty keyboard), the CPU 11 selects at least one character (second character) that is, in this example, a plurality of characters (B1, B2, . . . , Bn), based on a predetermined condition, from a plurality of characters, excluding the previously acquired character (A), which are included in the keyboard layout of the software keyboard (step B6).

The characters (B1, B2, . . . , Bn) can be selected by selecting a predetermined number of characters, for example, (1) at random, (2) in accordance with the character (A), (3) in accordance with a word that is a question, or (4) in accordance with a spelling (correct-answer character string) that is a correct answer to a word that is a question.

In the case (1) of selection at random, a character number (n) of characters (B1, B2, . . . , Bn) may be a preset fixed number, or may be changed in accordance with the input character number. For example, in a case where the input character number is small, the number of inputtable characters can be decreased by decreasing the selection number, and thereby it becomes easier to give, as an answer, a character that is a correct answer. Conversely, in a case where the input character number is small, the selection number may be increased, or the selection number may be changed in accordance with each input character number.

In the case (2) of the selection in accordance with the character (A), for example, other characters can be selected in accordance with the position of the character (A) in the keyboard layout.

In the case (3) of the selection in accordance with a word that is a question, characters of an answer, which is generally considered to tend to be erroneous to the question, can be selected.

In the case (4) of the selection in accordance with a spelling (correct-answer character string) that is a correct answer to a word that is a question, for example, characters of a spelling, which is generally considered to tend to be erroneous in regard to a spelling (correct-answer character string) that is a correct answer, are acquired.

In addition, the conditions for acquiring the character number (n) of characters (B1, B2, . . . , Bn) are not limited to the above-described conditions. Note that the acquisition using applied examples ((1) to (4)) of the character input method will be described later.

The CPU 11 causes the keyboard area 67 to display a software keyboard in which the character (A) that is a correct answer as an answer character and the characters (B1, B2, . . . , Bn) are rendered inputtable on the keyboard layout, and the other characters are rendered non-inputtable (step B7).

Here, the CPU 11 enters a standby state for an instruction by a user operation. If the CPU 11 detects a touch operation on the touch panel of the input device 16, the CPU 11 determines in which area the touch position by the touch operation is located, and executes a process corresponding to the touch position.

Here, in a case where a touch operation is performed on the software keyboard displayed on the keyboard area 67, if the touch position is located in a key area corresponding to an inputtable character, the CPU 11 determines that a character corresponding to the touch position is input (step B10, Yes). The CPU 11 causes the input character area 61 to display the input character, and causes the memory 12 to store the displayed answer character as answer data 12*d*. In addition, the CPU 11 stops the measurement of the elapsed time T from the time at which the answer character becomes inputtable (while storing the data of the value indicated by the elapsed time T at the time point of the stop), and causes the memory 12 to temporarily store the data indicative of the measured elapsed time T (step B11).

On the other hand, even in the case where the touch operation is performed on the software keyboard, if the touch position is in a key area corresponding to a non-inputtable character, the CPU 11 invalidates the touch operation (step B10, No). In other words, the CPU 11 regards the character corresponding to the touch position as being not input, and does not update the display on the input character area 61.

Since the software keyboard displayed on the keyboard area 67 is configured to be capable of inputting only some characters including a character that is a correct answer, the possibility that a user can input a correct character increases even in a case where the user answers a question (word) that the user cannot understand, and the motivation of the user to answer can be maintained. In addition, since a character that is an answer is selected from the software keyboard on which inputtable characters are restricted, an impression that the user selected the character becomes strong, and it is expectable that this leads to retention in memory.

If an answer character is input, the CPU 11 executes a process for inputting the next answer character in the same manner as described above (steps B2 to B5, B6, B7, and B10 to B12). Note that in the process of step B2 at the first time, measurement is started from the initial value (for example, 0 second) of the elapsed time T, and in the processes of step B2 at the second and following times, measurement is resumed from the elapsed time T at the time point at which the measurement in the previously executed step B11 was stopped.

FIG. 6 part (A) and FIG. 6 part (B) illustrate an example in which a word that is a question is "k) A;", and a correct answer to this word is "apple". In this case, in a case of inputting an answer character (alphabet) for a first-position character, only the keys of a character "a", which is a correct answer of the first-position character, and a plurality of characters "d", "s", "k", "l", "g", "o", "b", "s", "f", "n" and "p", which are acquired based on a predetermined condition, are rendered inputtable.

Similarly, in a case of inputting an answer character for a second-position character, only the keys of a character "p", which is a correct answer of the second-position character, and characters "o", "l", "k", "j", "u", "y", "t", "g", "v" and "c" are rendered inputtable. In a case of inputting an answer character for a third-position character, only the keys of a character "p", which is a correct answer of the third-position character, and characters "i", "u", "h", "b", "v", "c", "d", "e" and "w" are rendered inputtable. Then, only the keys of a character "l", which is a correct answer of a fourth-position character, and characters "r", "i", "o", "j", "b" and "m" are rendered inputtable, and only the keys of a character "e", which is a correct answer of a fifth-position character, and characters "u", "w", "h", "v" and "y" are rendered inputtable. Furthermore, in a case of inputting answer characters for a sixth-position character and the following, a plurality of appropriate characters can be rendered inputtable.

FIG. 6 part (A) illustrates a state in which two answer characters have been input, and thus a software keyboard corresponding to the input character position of an answer character for the third-position character to the question is displayed on the keyboard area 67. Specifically, with the inclusion of the character "p" that is the correct answer of the third-position character, the characters "i", "u", "h", "b", "v", "c", "d", "e" and "w" are rendered inputtable.

Note that in the software keyboard displayed on the keyboard area 67, the keys of inputtable characters and the keys of non-inputtable characters are displayed in different display modes. In the example illustrated in FIG. 6 part (A), the keys of inputtable characters are displayed in the same display mode (for example, black) as at the normal time, and the keys of non-inputtable characters may be displayed in a pale color (for example, light gray) or may not be displayed.

Note that as regards the display mode of characters (keys), it suffices if the keys of inputtable characters and the keys of non-inputtable characters can be distinguished in regard to the colors of characters or backgrounds of keys, the fonts or character sizes of the characters of the keys, and the like, and display modes other than the above can be used.

If the answer character "p" of the third-position character is input in the state illustrated in FIG. 6 part (A), a software keyboard for inputting an answer character of the fourth-position character is displayed as illustrated in FIG. 6 part (B). Specifically, only the keys of the character "1", which is the correct answer of the fourth-position character, and characters "r", "i", "o", "j", "b" and "m" in the keyboard layout are displayed in the inputtable state.

In this manner, in accordance with the input character number of answer characters (the position of a character to be next input (first-position character, second-position character, or the like) in the answer characters), inputtable characters and non-inputtable characters, among the keys in the keyboard layout, can be changed.

Note that on the screen at the question-setting time, if a touch operation on the skip button 65 is detected (step B13, Yes), the CPU 11 skips the process of the current question, transitions to the process of the next question, and executes a process similar to the above-described process (FIG. 3 (step A6), FIG. 4 (step B1~).

In addition, on the screen at the question-setting time, if a touch operation on the answer button 64 is detected (step B14, Yes), the CPU 11 compares the input answer characters indicated by the answer data 12d with the correct answer data 12c3, and executes correct/incorrect determination (step B15). Furthermore, in step B15, the CPU 11 stops measurement of the elapsed time T, and correlates and stores the elapsed time T, which is the answer time of the user for the word displayed in the question word area 60, and the corresponding answer data 12d. Upon finishing the correct/incorrect determination, the CPU 11 causes the display 17 to display a screen for a correct/incorrect determination result of the word learning test, and terminates the question-setting process (step B16). Thus, by outputting the correct/incorrect determination result, the result by the performance of the word learning test can be confirmed, and the motivation to learn by using the word learning test can be maintained.

Figure 7:
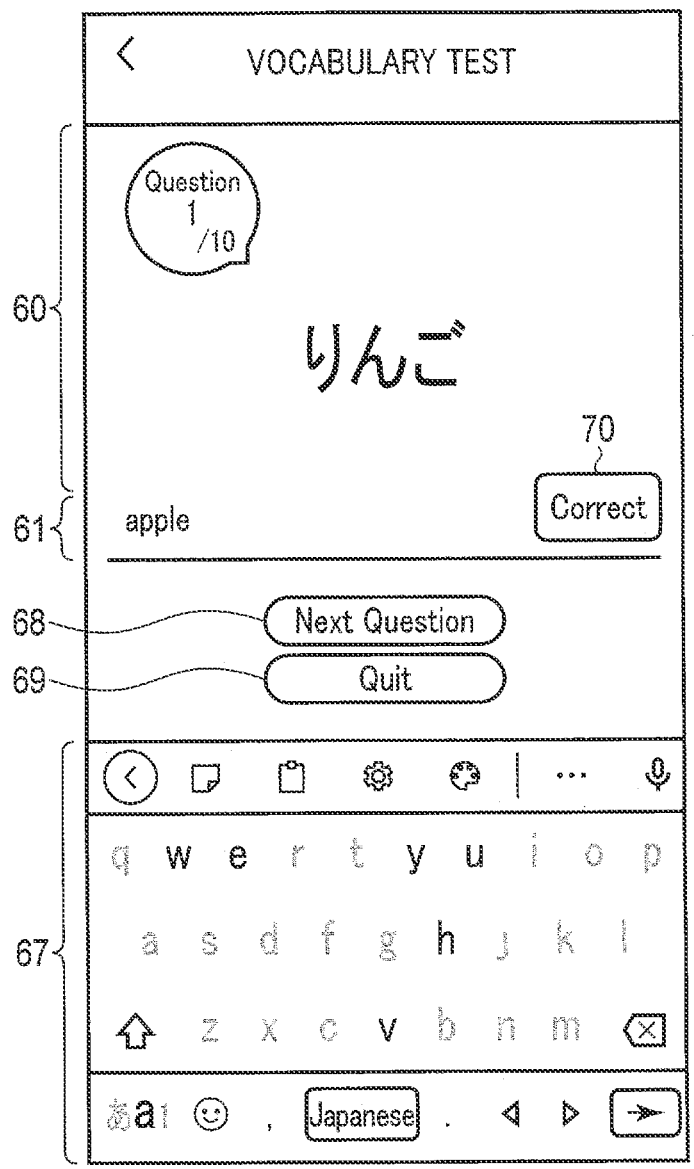
FIG. 7 is a view illustrating an example of a screen for a correct/incorrect determination result in the present embodiment.

FIG. 7 is a view illustrating an example of the screen for the correct/incorrect determination result in the present embodiment.

On the screen for the correct/incorrect determination result, for example, in the input character area 61, a correct/incorrect determination result 70 is displayed. In FIG. 7, characters of "Correct" indicating that a correct answer is determined by the correct/incorrect determination are displayed. Note that characters of "Incorrect" are displayed in a case where an incorrect answer is determined by the correct/incorrect determination.

In addition, on the screen for the correct/incorrect determination result, in place of the answer button 64 and the skip button 65, a next-question button 68 for instructing a transition to the next question and a quit button 69 for giving an instruction to quit the word learning test are displayed.

On the screen for the correct/incorrect determination result, if a touch operation on the next-question button 68 is detected (FIG. 3, step A8, Yes), the CPU 11 executes a question-setting process for the next question in the same manner as described above (step A6).

In addition, on the screen for the correct/incorrect determination result, if a touch operation on the quit button 69 is detected (FIG. 3, step A9, Yes), the CPU 11 transmits to the server 30 the answer data 12*d* indicative of the answer contents (answer character strings) for the respective executed questions (words), and the answer time (elapsed time T) associated with the answer data 12*d* (step A10), and terminates the word learning process. Note that if the question-setting process is terminated and, as a result, all questions are answered (step A7, Yes), the CPU 11 transmits the answer data 12*d* and the answer time to the server 30 in the same manner as described above (step A10), and terminates the word learning process.

The above description was given of the "qwerty keyboard" (FIG. 6, FIG. 7). Next, the case of the "flick input keyboard" is described.

In the case where the input keyboard type is the "flick input keyboard" (FIG. 4, step B5, "Flick input"), the CPU 11 selects a character (second character) of at least one key (included in the group) for inputting an inputtable character, here, a plurality of characters (B1, B2, . . . , Bn) of keys, based on a predetermined condition, from a plurality of characters included in the keyboard layout of the software keyboard. In other words, the key of a representative character of the group including inputtable characters is selected.

Here, like the above-described input keyboard type of the "qwerty keyboard", a corresponding character (A) (first character) in the correct-answer character string, which corresponds to the input character position of the answer character to the word that is the question, and a character (second character) selected from a plurality of characters excluding the character (A), are set to be inputtable characters (step B9).

Figure 8:
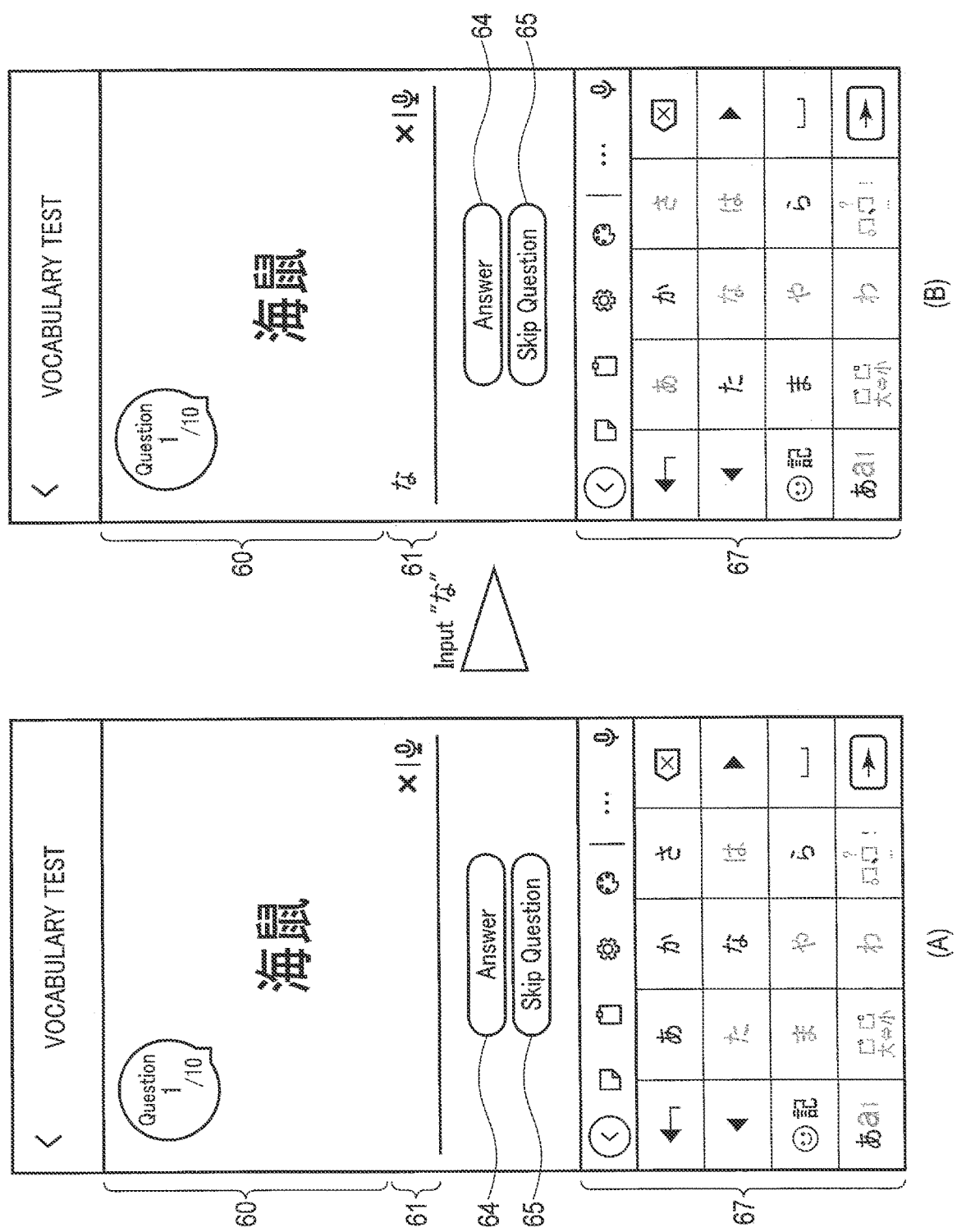
FIG. 8 is a view illustrating an example in which a software keyboard of a "flick input keyboard" type in the present embodiment is displayed.

FIG. 8 part (A) and FIG. 8 part (B) illustrate an example in which the software keyboard of the "flick input type" in the present embodiment is displayed.

FIG. 8 part (A) and FIG. 8 part (B) illustrate an example in which a word that is a question is "海鼠", and a correct answer to this word is "なまこ". In this case, in a case of inputting an answer character (hiragana) for a first-position character, only the keys of a representative character "な" of the group (な-column) including the character "な" (first character) that is a correct answer of the first-position character on the software keyboard (keyboard layout), and characters of groups (あ-column, か-column, さ-column, ら-column) including a plurality of second characters, which are acquired based on a predetermined condition, are rendered inputtable.

Here, if the answer character "た" for the first-position character is input, the CPU 11 changes inputtable characters and non-inputtable characters of the software keyboard, as illustrated in FIG. 8 part (B). In this case, only a representative character "ま" of the group (ま-column) including a character "ま" (first character) that is a correct answer of a second-position character, and, for example, characters of groups (か-column, た-column, ら-column) including a plurality of second characters, which are acquired based on a predetermined condition, are rendered inputtable.

Similarly, if the answer character "ま" for the second-position character is input, only a representative character "か" of the group (か-column) including a character "こ" (first character) that is a correct answer of a third-position character, and, for example, characters of groups (あ-column, さ-column) including a plurality of second characters, which are acquired based on a predetermined condition, are rendered inputtable. Further, if answer characters for a fourth-position character and the following are input, a plurality of appropriate characters can be rendered selectable and inputtable.

Note that in the "flick input keyboard" type, by selecting the key of a character on the keyboard layout, the keys of the other characters in the group are displayed around the selected key. For example, on the software keyboard illustrated in FIG. 8 part (A) if the key of "た" is touched, the keys of "に", "ぬ", "ね" and "の" in the same group are displayed around the key of "た". At this type, of the characters "に", "ぬ", "ね" and "の", an inputtable character and a non-inputtable character may be displayed.

In this manner, even in the case of using the software keyboard of the "flick input keyboard" type, the same operation and effect can be obtained as in the case of using the software keyboard of the above-described "qwerty keyboard" type.

Next, applied examples of the character input method in the present embodiment are described.

To begin with, a description is given of (1) the first method of selecting inputtable characters (second characters), based on answer characters that were input in connection with words in the past (for example, erroneous characters at the time of answering in the past).

As described above, upon terminating the word learning process, the information processing apparatus 10 that performed the word learning test transmits the answer data 12*d* and the answer time (elapsed time T), which is associated with the answer data 12*d*, to the server 30 (step A10). If the CPU 31 of the server 30 transmits the word learning data 32*d* and receives the answer data 12*d* and the answer time of the word learning test conducted based on this word learning data 32*d* (step C4), the CPU 31 classifies the answer contents (answer character strings) indicated by the answer data 12*d* in regard to each question (word) and registers the classified answer contents in the answer database 32*e*.

The CPU 31 updates the answer data table 32*d*2 for each question (word), based on the answer contents (answer character strings) classified in regard to each question (word), which were registered in the answer database 32*e* at a freely chosen timing (step C6). Specifically, the results of word learning tests performed by a plurality of users are totalized in regard to each word.

FIG. 9 is a view illustrating an example of the answer data table 32*d*2 in the present embodiment. FIG. 9 illustrates the answer data table 32*d*2 in which the results of word learning tests for a word "奮闘する" (correct-answer character string "struggle") that is a question (word), which were performed by a plurality of users, are totalized.

In the answer data table 32*d*2, answer character strings indicated by the answer data acquired from users (user IDs) and results of correct/incorrect determination are registered. In the answer data table 32*d*2, an answer character, which was incorrectly input at each character position for the correct-answer character string "struggle", can be specified.

In a case of providing the word learning data 32d to the information processing apparatus 10, the server 30 provides the answer data table 32d2 together with the question data 32d1 and the correct answer data 32d3.

In the word learning process (word learning program 12b) that is executed by the information processing apparatus 10, at a time of selecting inputtable characters on the software keyboard, characters that are erroneously input at input positions of answer characters are acquired by referring to the answer data table 32d2.

For example, in the case of the answer data table 32d2 illustrated in FIG. 9, in regard to the answer character that is input as the first-position character for the word "奮闘する" that is the question, erroneously input characters are "f", "g" and "h", and thus the characters "f", "g" and "h" are selected as inputtable characters.

In a case where the number of characters that are rendered inputtable is determined, inputtable characters are acquired until the number of inputtable characters reaches a necessary number in the order beginning with a character that is most frequently incorrectly input. In addition, in a case where the number of characters that are rendered inputtable is not reached even if all erroneously input characters are selected, a character may be acquired from the other characters, for example, at random.

Similarly, in a case where an answer character "s" is input as a first-position character, characters "c" and "k", which are erroneously input as answer characters following the correct-answer character "s" are preferentially acquired as inputtable characters on the software keyboard at a time of inputting a second-position character.

Subsequently, in a case where an answer character "t" is input as the second-position character, characters "l", which are erroneously input as answer characters following the correct-answer characters "s" and "t" are preferentially acquired as inputtable characters on the software keyboard at a time of inputting a third-position character.

Thereafter, according to the same rule, inputtable characters (second characters) are acquired in accordance with the input position of the answer character, and a software keyboard in which inputtable characters are restricted is displayed.

In this manner, by restricting inputtable characters on the software keyboard in such a manner as to include characters that were actually erroneously input as answer characters by the user that performed the word learning test, it becomes easier for the user to grapple with answering at a time of inputting an answer character, and has a strong impression that the user has selected a character that is an answer, and it is expectable that this leads to retention in memory.

Note that in the above description it is assumed that the answer data by users are totalized in the server 30 to create the answer data table 32d2, but, for example, the answer data table 12c2 may be created in the information processing apparatus 10. Specifically, the information processing apparatus 10 (word learning program 12b) creates the answer data table 12c2 by totalizing the answer data in regard to each word, as the result of the word learning test performed by the user, and acquires inputtable characters on the software keyboard, based on the answer data table 12c2. Thereby, the software keyboard, in which characters are restricted in such a manner as to include characters that the user himself/herself erroneously input as answer characters in the past, can be provided, and answer characters are selected by correcting erroneously input characters in the past, and therefore a learning effect can be expected.

In addition, in the above description, by the word learning process by the word learning program 12b, inputtable characters (erroneously input characters in the past) are acquired based on the answer data table 12c2. However, by providing an AI (Artificial Intelligence) function in the word learning program 12b, inputtable characters may be acquired. In this case, inputtable characters can be acquired in the same manner as described above, based on the erroneous inputs of answer characters in the past, by causing the AI function to learn the answer data by users, or the answer data by each user, which are totalized in the server 30.

Besides, instead of providing the AI function in the word learning program 12b of the information processing apparatus 10, an AI function that learned the answer data by users may be provided in the word learning management program 32b of the server 30. In this case, at a time of performing a word learning test, the information processing apparatus 10 transmits to the server 30 the answer characters (answer data) that is input to the question of the word learning test by the user operation and the answer time, and inputtable characters are acquired by the AI function of the server 30. The information processing apparatus 10 (word learning program 12b) receives the data indicative of the characters acquired by the server 30, and the software keyboard, in which inputtable characters are restricted in accordance with this data, is displayed in the same manner as described above.

Next, a description is given of (2) the second method of selecting inputtable characters, based on the difficulty level indicated by the input rule difficulty-level data 12e.

For example, by presetting the input rule difficulty-level data 12e by a user operation, the number of inputtable characters on the software keyboard is changed in accordance with the difficulty level of the input rule indicated by the input rule difficulty-level data 12e. For example, it is assumed that the difficulty level of the input rule is set by three levels of 1 (easy), 2 (normal) and 3 (difficult). In this case, the character number of inputtable characters is set at 4 for the difficulty level 1 (easy), the character number of inputtable characters is set at 5 for the difficulty level 2 (normal), and the character number of inputtable characters is set at 6 for the difficulty level 3 (difficult).

Thereby, since the software keyboard, in which inputtable characters are restricted in accordance with the difficulty level desired by the user, can be provided, the motivation of the user for the word learning test can be maintained.

Next, a description is given of (3) the third method of changing inputtable characters in accordance with an elapsed time from a time at which an answer character becomes inputtable.

Figure 10:
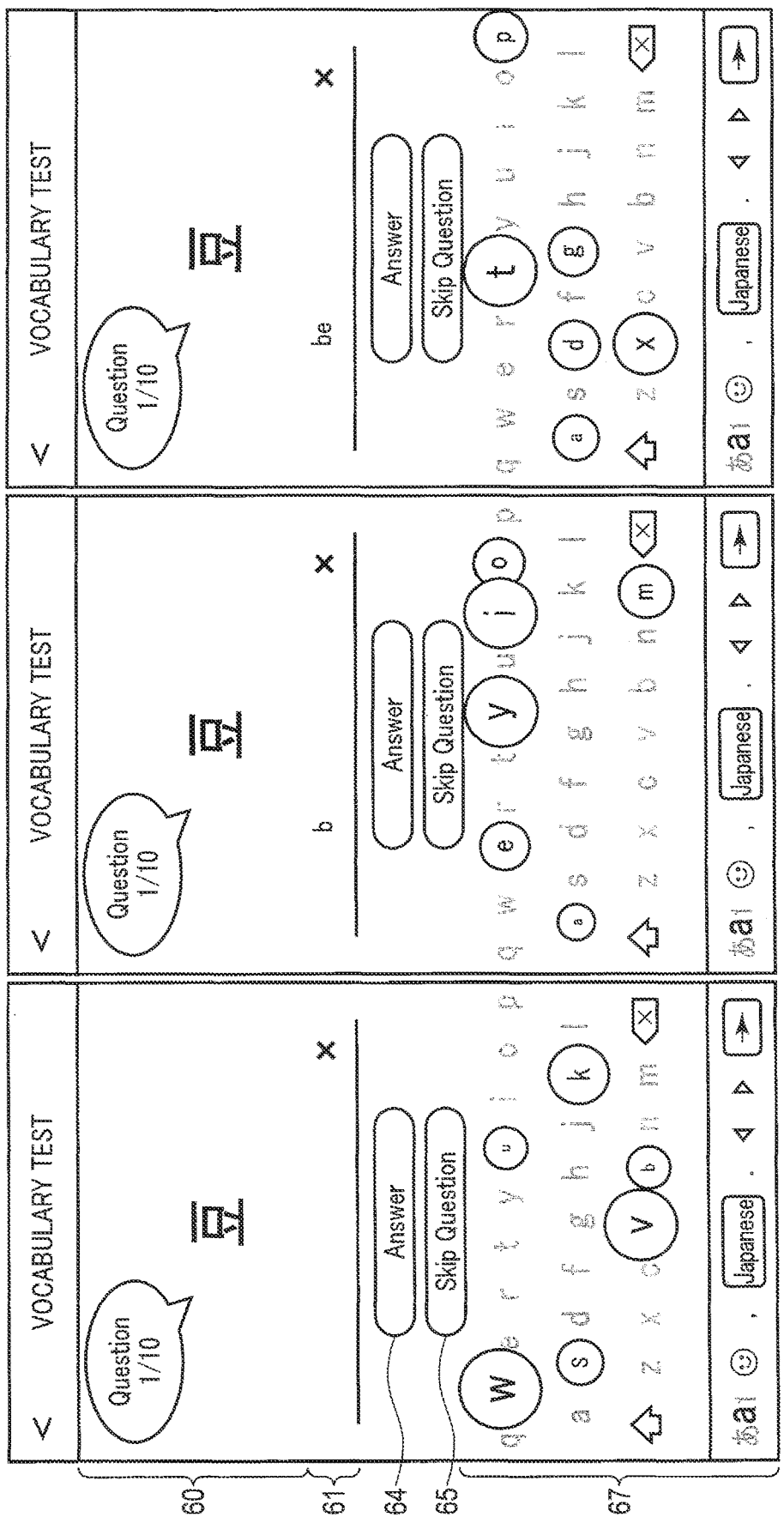
FIG. 10 is a view illustrating an example in which an answer character string "bean" that is a correct answer is input to a question "豆" of a word learning test in the present embodiment.
Figure 11:
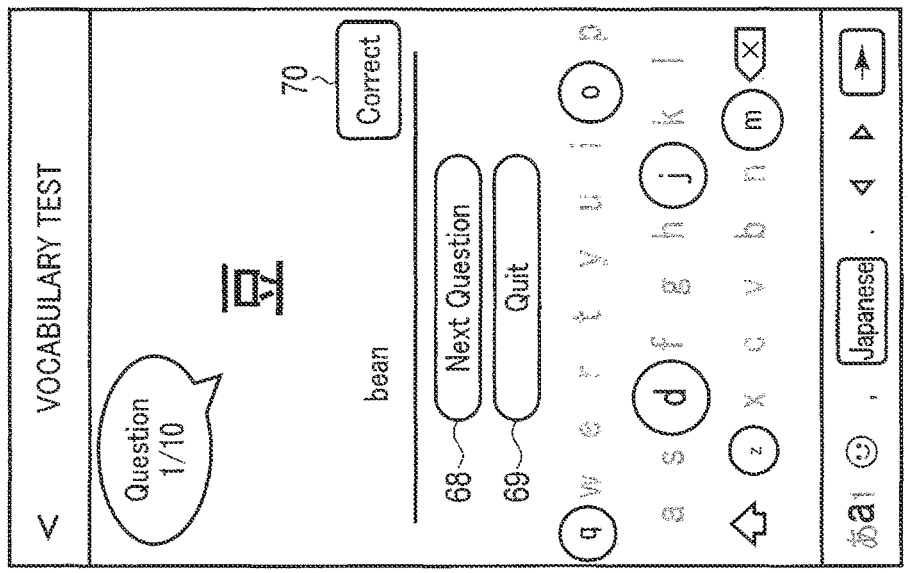
FIG. 11 is a view illustrating an example in which the answer character string "bean" that is the correct answer is input to the question "豆" of the word learning test in the present embodiment.

FIG. 10 and FIG. 11 illustrate an example in which an answer character string "bean" that is a correct answer is input to a question "豆" in a word learning test in the present embodiment.

As illustrate in FIG. 10 part (A), in a case of inputting a first-position character, a software keyboard is displayed in which a character "b" that is a correct answer and a plurality of characters "w", "u", "s", "k" and "v" are set as inputtable characters. On the software keyboard illustrated in FIG. 10 and FIG. 11, a display mode is adopted in which inputtable characters (alphabet) are displayed in circles of different sizes. Thereby, inputtable characters and non-inputtable characters can easily be distinguished.

In a case where an answer character "b" for the first-position character was input and a second-position character is to be input, as illustrated in FIG. 10 part (B), a software keyboard is displayed in which a character "e" that is a correct answer and a plurality of characters "y", "i", "o", "a" and "m" are set as inputtable characters. Subsequently, in a similar manner, characters acquired in accordance with character input positions are displayed on the keyboard area 67 as inputtable characters, as illustrated in FIG. 10 part (C) at a time of inputting a third-position character, and as illustrated in FIG. 11 part (A) at a time of inputting a fourth-position character. In FIG. 11 part (B), a touch operation is performed on the answer button 64, and thereby a correct/incorrect determination process is executed for the input answer character string "bean", and a correct/incorrect determination result 70 ("Correct") is displayed in FIG. 11 part (C).

In the case of using the third method, the CPU 11 changes, for example, characters displayed as inputtable characters to non-inputtable characters one by one, in accordance with the elapsed time T from the start of measurement in step B2. In this case, a character (first character) that is a correct answer is always displayed as an inputtable character, and a character that is changed to a non-inputtable character is selected from the other characters (second characters), for example, one by one at random.

In this manner, by changing the inputtable characters to non-inputtable characters one by one in accordance with the elapsed time T, the number of inputtable characters becomes smaller with the elapsed time T. Specifically, since the number of choices of answer characters becomes smaller, answering to the word learning test becomes easier even for a user who has begun to learn, and the motivation can be maintained.

Note that, as illustrated in FIG. 10 and FIG. 11, in the display mode of the software keyboard, the size of a character (circular shape) may be changed with the elapsed time T. As regards the size changing rule, for example, the size may be changed irregularly, or the size of the character that is the correct answer (the character "b" in the case of FIG. 10 part (A)) may be increased with the elapsed time T, thereby making the character that is the correct answer more easily selectable.

Aside from the display mode of displaying characters in circles with different sizes, other display modes may be used, such as by changing the colors of characters or backgrounds of keys, the fonts of the characters of the keys, and the like.

Next, a description is given of (4) the fourth method of selecting inputtable characters in accordance with a result of correct/incorrect determination in regard to an answer character that was input to a question.

In the case of using the fourth method, the CPU 11 executes correct/incorrect determination on a character-by-character basis, based on the correct answer data 12c3, in regard to answer characters that are input to the question. If an answer character is input to the question, the CPU 11 executes correct/incorrect determination. If the answer character is determined to be correct, the number of inputtable characters on the software keyboard for inputting the next answer character is made less than a preset reference number. If the answer character is determined to be incorrect, the number of inputtable characters on the software keyboard for inputting the next answer character is made greater than a preset reference number. Besides, if answer characters are successively determined to be correct, the number of inputtable characters, which was made smaller, may be made further smaller. If answer characters are successively determined to be incorrect, the number of inputtable characters, which was made greater, may be made further greater.

Note that in the case of decreasing/increasing the number of inputtable characters, the number of inputtable characters can be changed in units of a predetermined number of characters (for example, one character), or can be changed in accordance with the length of the correct-answer character string (for example, as the length of the correct-answer character string becomes greater, a change is made from one character→two characters), or the number of characters that is decreased/increased can be changed at random.

Alternatively, conversely to the above-described case, if the answer character is determined to be correct, the number of inputtable characters may be increased, and if the answer character is determined to be incorrect, the number of inputtable characters may be decreased.

Thereby, since the number of inputtable characters on the software keyboard can dynamically be changed in accordance with the condition of the correct/incorrect determination of the answer character that is actually input to the question, i.e., in accordance with the level of the user, the display control of the software keyboard, which matches with the user, can be executed. Therefore, the motivation of the user for the word learning test can be maintained.

Furthermore, in the fourth method, the character number of inputtable characters on the software keyboard can also be changed by combining the elapsed time T until the input of the answer character, with the result of correct/incorrect determination of the answer character.

In this case, each time an answer character is input, the CPU 11 determines the character number of inputtable characters (the selection number of second characters) on the software keyboard for inputting the next answer character, in accordance with the combination of the correct/incorrect determination result and the elapsed time T until the input of the answer character.

For example, in accordance with the input of an answer character for a first-position character, the character number of inputtable characters (the selection number of second characters) can be determined in the following manner.

(1) In a case where the answer character is correct and the elapsed time T1 is less than a reference value, the character number of inputtable characters is set at a number (K1) less than a reference number.

(2) In a case where the answer character is correct and the elapsed time T1 is equal to or greater than the reference value, the character number of inputtable characters is set at a number (K2) greater than the reference number.

(3) In a case where the answer character is incorrect and the elapsed time T1 is less than the reference value, the character number of inputtable characters is set at a number (K3) greater than the reference number.

(4) In a case where the answer character is incorrect and the elapsed time T1 is equal to or greater than the reference value, the character number of inputtable characters is set at a number (K4) greater than the reference number.

Here, the character number of inputtable characters is set to have a relationship of $K1<K2<K3<K4$.

Similarly, in accordance with the input of answer characters for a second-position character and the following, the character number of inputtable characters on the software keyboard is determined in the same manner as described above, in accordance with the combination of the correct/incorrect determination result (correct answer/incorrect answer) of the answer character and the elapsed time T (T2, T3, ...).

Note that in the above-described example, the character number is determined to have the relationship of K1<K2<K3<K4, but the character number may be determined to have a relationship of K4<K3<K2<K1. Which of the relationships is to be used as the basis for determining the character number may be determined in advance or may be discretionarily set by the user.

In addition, although the character number is set to be less than the reference number only in the case where the answer character is correct and the elapsed time T1 is less than the reference value, the character number may be set to be less than the reference number in the cases of (1) and (2), or in the cases of (1) to (3).

Figure 12:
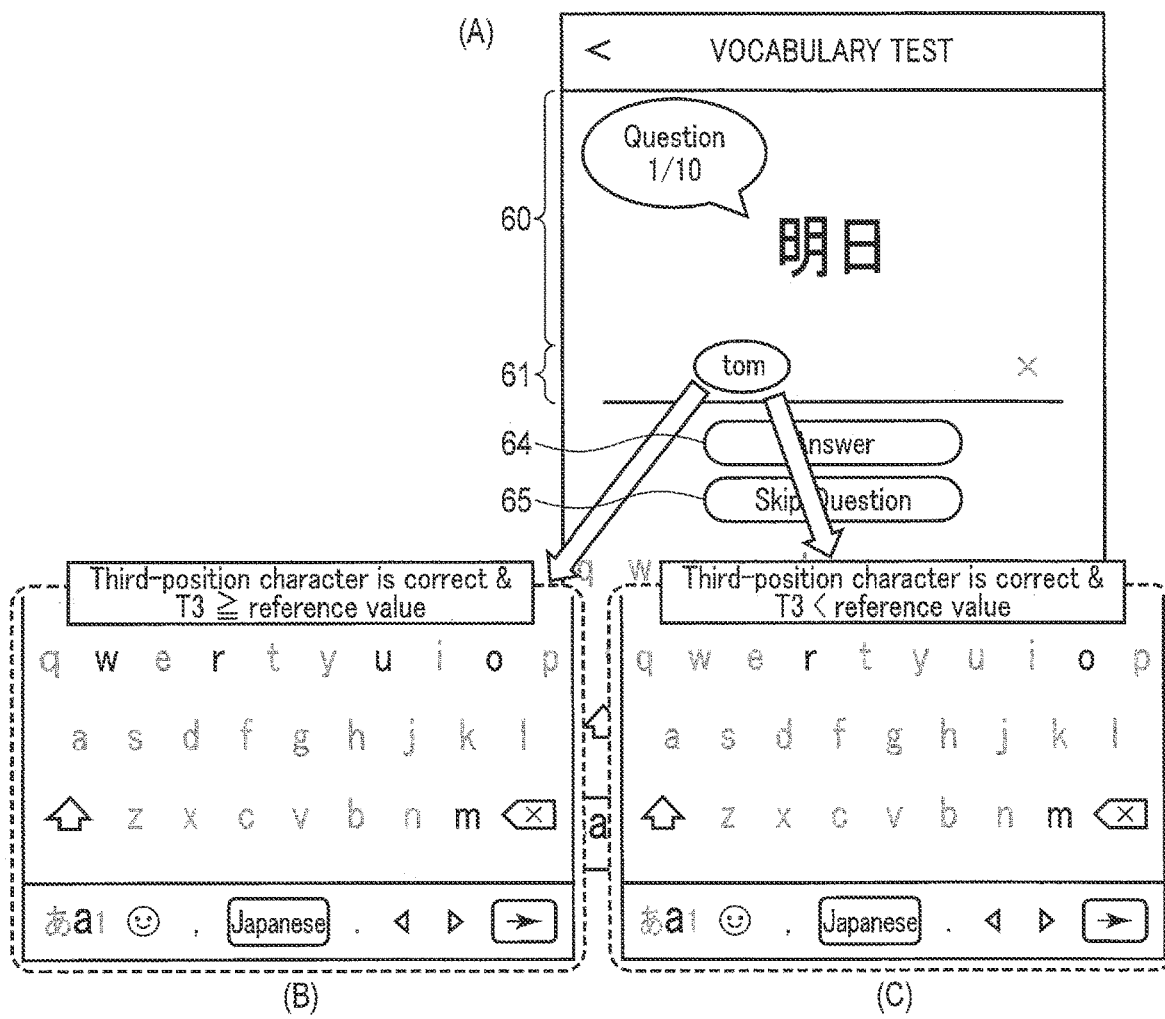
FIG. 12 is a view illustrating a display example of a software keyboard in the present embodiment.

FIG. 12 illustrates a display example of the software keyboard in a case where a word that is a question is "明日" and a correct answer is "tomorrow" in the present embodiment.

FIG. 12 part (A) illustrates, for example, a state in which an answer character string "tom" up to a third-position character is input. In this case, the answer character "m" for the third-position character is determined to be a correct answer by correct/incorrect determination.

If an elapsed time T3 until the input of the answer character "m" for the third-position character is equal to or greater than the reference value, as illustrated in FIG. 12 part (B), a character "o" that is a correct answer for a fourth-position character, and four characters "w", "r", "u" and "m" are selected as inputtable characters. On the other hand, if the elapsed time T3 is less than the reference value, as illustrated in FIG. 12 part (C), the character "o" that is the correct answer for the fourth-position character, and only two characters "r" and "m" are selected as inputtable characters.

Note that in the above description, the character number of inputtable characters is determined in accordance with the combination of the correct/incorrect determination result (correct answer/incorrect answer) of the answer character and the elapsed time T (T2, T3, . . . ), but the character number of inputtable characters may be increased/decreased based on only the elapsed time T.

In this manner, the number of inputtable characters on the software keyboard can dynamically be changed in accordance with the time (elapsed time T) needed until the input of the answer character. In other words, since there is a case where the time needed to input an answer character differs depending on the level of the user, the display control of the software keyboard, which matches with the user, can be executed. Therefore, the motivation of the user for the word learning test can be maintained.

Note that the above-described applied examples (1) to (4) of the character input method may be discretionarily combined and executed.

Additionally, in the above-described embodiment, the case is described in which the server 30 and the information processing apparatus 10 cooperates, and the word learning test is performed in the information processing apparatus 10, but the word learning test can be performed by the information processing apparatus 10 alone. In this case, the memory 12 stores the word learning data 12c corresponding to a plurality of questions of the word learning test, as well as the word learning program 12b. At a time of executing the word learning process, the word learning program 12b may acquire the question data 12c1 that is provided to the user, and the correct answer data 12c3, and may execute the same process as described above.

Additionally, in the above-described embodiment, the display control of the software keyboard at the time of the word learning test is executed by the word learning process by the information processing apparatus 10 (word learning program 12b), but the display control of the software keyboard may be executed by a keyboard control process by the server 30. In this case, the information processing apparatus 10 transmits to the server 30 the answer data 12d each time an answer character is input to a question of the word learning test. In accordance with the answer data received from the information processing apparatus 10, the server 30 selects inputtable characters of the software keyboard, as described above, and notifies the inputtable characters to the information processing apparatus 10. Responding to the notification from the server 30, the information processing apparatus 10 displays the software keyboard on which the inputtable characters are restricted.

Thereby, the server 30 and the information processing apparatus 10 cooperate to implement the display control (character input method) of the software keyboard in the information processing apparatus 10, and thereby the processing load on the information processing apparatus 10 can be reduced.

Additionally, although it is assumed that the keyboard control program 12b1, which controls the display of the software keyboard, is included in the word learning program 12b, the keyboard control program 12b1 can be provided as a program that is independent from the word learning program 12b. In this case, the keyboard control program 12b1 can provide a character input method for restricting inputtable characters on the keyboard layout, not only in the case of displaying the software keyboard for the word learning test, but also in the case of inputting, for example, sentences.

Additionally, in the above description, the example is described in which the objects of the input to the software keyboard are English (alphabet) and Japanese (hiragana), but the objects may be other languages (Chinese, Korean, Arabic, etc.).

Additionally, the methods described in the embodiment, i.e., the methods of processes or the like illustrated in the flowcharts, can be distributed as computer-executable programs by being stored in recording media such as a memory card (ROM card, RAM card or the like), a magnetic disk (flexible disk, hard disk or the like), an optical disc (CD-ROM, DVD or the like), or a semiconductor memory. In addition, the computer reads in the program recorded in an external recording medium, and the operation of the computer is controlled by the program, and thereby the same processes as in the functions described in the embodiment can be implemented.

The data of the programs for implementing the respective methods can be transmitted over a network (the internet) in the form of program code, and the program data can be taken in from a computer connected to the network, and thus the same functions as in the above-described embodiment can be implemented.

The present invention is not limited to the above-described embodiment. In practice, various modifications may be made without departing from the spirit of the invention. The embodiment includes inventions in various stages, and various inventions can be derived from proper combinations of structural elements disclosed herein. For example, even if some structural elements in all the structural elements disclosed in the embodiment are omitted or some structural elements are combined, if the problem described in the specification can solved and the advantageous effects can be obtained, the structure, in which the structural elements are omitted or combined, can be derived as an invention.

What is claimed is:

1. A character input method executed by a computer, the method comprising:
controlling a display to display a keyboard layout including a plurality of keys which are usable by a user to input each of characters of an answer character string corresponding to a correct-answer character string, the controlling comprising controlling the display to display the keyboard layout in a state indicating that a first character of the correct-answer character string, and at least one second character other than the first character, are inputtable, and a third character other than the first character and the second character is non-inputtable, the first character corresponding to an input character position of the answer character string,
wherein:
the answer character string is a character string of the user's answer to a question of a word learning test,
the correct-answer character string is a predetermined character string as an answer to the question of the word learning test,
the first character of the correct-answer character string is a correct character for the input character position of the answer character string, and
the second character is an incorrect character for the input character position of the answer character string.

2. The character input method of claim 1, further comprising:
acquiring a word, and a spelling corresponding to the word; and
setting the acquired spelling to be the correct-answer character string.

3. The character input method of claim 2, further comprising:
controlling the display to display the keyboard layout in a state indicating that the second character, which is acquired from the keyboard layout, based on an answer character string determined to be incorrect among a plurality of answer character strings stored as answers to the question of the word learning test, is inputtable.

4. The character input method of claim 2, wherein further comprising:
comparing an answer character string that is input to the word, and the spelling, and controlling the display to display a result of the comparison.

5. The character input method of claim 2, further comprising:
providing the word and a spelling corresponding to the word to an information processing apparatus which includes the display;
acquiring the answer character string for the spelling relating to the word from the information processing apparatus; and
prompting the user to input each of the characters of the answer character string corresponding to the correct-answer character string by an input device of the information processing apparatus, and in a state in which the keyboard layout is displayed on the display of the information processing apparatus, controlling the display of the information processing apparatus to display the keyboard layout, in the state indicating that the first character of the correct-answer character string, which corresponds to the input character position of the answer character string, and the at least one second character other than the first character, are inputtable, and the third character other than the first character and the second character is non-inputtable.

6. The character input method of claim 1, further comprising:
controlling an input device in such a manner as to enable an input of a character that is indicated to be inputtable, and to disable an input of a character that is indicated to be non-inputtable, in the keyboard layout displayed on the display; and
changing a display state of the keyboard layout in such a manner as to indicate, in accordance with the input character position that is updated in accordance with an input of the answer character string by the input device, that the first character, which corresponds to the updated input character position, and the second character are inputtable, and the third character other than the first character and the second character that are rendered inputtable is non-inputtable.

7. The character input method of claim 6, further comprising:
controlling the display to display the keyboard layout as a software keyboard capable of inputting a character by designating, by an operation of the input device, a display position of each of characters displayed as the keyboard layout on the display.

8. The character input method of claim 1, further comprising:
presetting a difficulty level indicative of any one of a plurality of levels; and
determining a number of the second characters in accordance with the difficulty level.

9. The character input method of claim 1, further comprising:
determining a number of the second characters in accordance with at least either an elapsed time from a time at which an answer character is rendered inputtable, or a result of correct/incorrect determination of the answer character and the first character.

10. The character input method of claim 1, further comprising:
changing a display mode of the second character on the keyboard layout in accordance with an elapsed time from a time at which an answer character is rendered inputtable.

11. The character input method according to claim 1, further comprising setting, in the displayed keyboard layout, as the at least one second character other than the first character, one or more characters that were erroneously input by the user in the past as an answer character at the corresponding input character position for the correct-answer character string.

12. The character input method according to claim 1, wherein:
the controlling comprises controlling the display to display the keyboard layout in a state indicating that the first character and a plurality of the second characters are inputtable, and the one or more third characters are non-inputtable, the plurality of second characters being incorrect characters for the input character position of the answer character string, and
the method further comprises:
measuring an elapsed time from a time at which the first character and the plurality of second characters are rendered inputtable until the user inputs a character among the first character and the plurality of second characters, and
controlling the display to display the keyboard layout such that, as the elapsed time increases, the inputtable second characters are changed to non-inputtable third characters incrementally, whereby a number of the inputtable second characters decreases and a number of the non-inputtable third characters increases as the measured elapsed time increases.

13. An information processing apparatus comprising:
a display,
an input device, and
a processor,
the processor being configured to execute a process of:
controlling the display to display a keyboard layout including a plurality of keys which are usable by a user to input each of characters of an answer character string corresponding to a correct-answer character string, the controlling comprising controlling the display to display the keyboard layout in a state indicating that a first character of the correct-answer character string, and at least one second character other than the first character, are inputtable, and a third character other than the first character and the second character is non-inputtable, the first character corresponding to an input character position of the answer character string,
wherein:
the answer character string is a character string of the user's answer to a question of a word learning test,
the correct-answer character string is a predetermined character string as an answer to the question of the word learning test,
the first character of the correct-answer character string is a correct character for the input character position of the answer character string, and
the second character is an incorrect character for the input character position of the answer character string.

14. An information processing system including an information processing apparatus and a server apparatus,
the information processing apparatus being configured to execute a process of:
receiving, from the server apparatus, information of a question of a word learning test relating to a word, and a correct-answer character string which is a predetermined character string as an answer to the question of the word learning test; and
controlling a display to display a keyboard layout including a plurality of keys which are usable by a user to input each of characters of an answer character string corresponding to a correct-answer character string, the controlling comprising controlling the display to display the keyboard layout in a state indicating that a first character of the correct-answer character string to the question, and at least one second character other than the first character, are inputtable, and a third character other than the first character and the second character is non-inputtable, and the server apparatus being configured to execute a process of:
transmitting the information of the question and the correct-answer character string to the question to the information processing apparatus;
receiving the answer character string to the question from the information processing apparatus; and
registering the received answer character string as an answer to the question by the user,
wherein:
the answer character string is a character string of the user's answer to the question of the word learning test,
the first character of the correct-answer character string is a correct character for the input character position of the answer character string, and
the second character is an incorrect character for the input character position of the answer character string.

* * * * *